United States Patent Office 2,744,111
Patented May 1, 1956

---

2,744,111

N-(SULFONYLPHENACYL)HEXAMETHYLENE-TETRAMINIUM HALIDES

Walter A. Gregory, Wilmington, Del., assignor to E. I. du Pont de Nemours and Company, Wilmington, Del., a corporation of Delaware No Drawing. Application February 16, 1953, Serial No. 337,236

6 Claims. (Cl. 260—248.5)

This invention relates to N-(organic substituted sulfonylphenacyl)hexamethylenetetraminium halides.

This application is a continuation-in-part of my copending application Serial No. 257,986 filed November 23, 1951.

The N-(organic substituted sulfonylphenacyl)hexamethylenetetraminium halides of the invention are represented by the formula:

1. 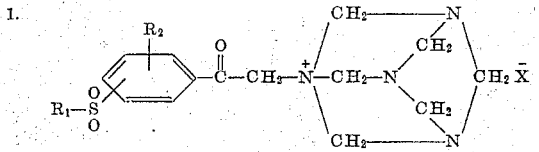

where $R_1$ is a member of the group consisting of alkyl, halogeno lower alkyl, cyclopentyl, cyclohexyl and vinyl groups having up to 12 carbon atoms or a haloaliphatic radical containing up to 12 carbon atoms, $R_2$ is a member of the class consisting of hydrogen, halogen, lower alkyl and lower alkoxy and X is a halogen of the group consisting of chlorine and bromine.

The terms "lower alkyl" and "lower alkoxy" as used herein include all alkyl and alkoxy radicals containing not more than 6 carbon atoms.

Illustrative of the compounds of the invention are:

N - [p - (chloromethylsulfonyl)phenacyl]hexamethylenetetraminium chloride

N - [p - (dichloromethylsulfonyl)phenacyl]hexamethylenetetraminium chloride

N - [p - (bromomethylsulfonyl)phenacyl]hexamethylenetetraminium bromide

N - [p - (fluoromethylsulfonyl)phenacyl]hexamethylenetetraminium bromide

N - [p - (trichloromethylsulfonyl)phenacyl]hexamethylenetetraminium chloride

N - [p - (trifluoromethylsulfonyl)phenacyl]hexamethylenetetraminium bromide

N - (p - cyclopentylsulfonylphenacyl)hexamethylenetetraminium bromide

N-(p - vinylsulfonylphenacyl)hexamethylenetetraminium bromide

N-(p - methysulfonylphenacyl)hexamethylenetetraminium bromide

N-(p - ethylsulfonylphenacyl)hexamethylenetetraminium chloride

N -(p - n-propylsulfonylphenacyl)hexamethyleneteraminium chloride

N - (p - isopropylsulfonylphenacyl)hexamethylenetetraminium chloride

N-(p - n - butylsulfonylphenacyl)hexamethylenetetraminium bromide

N-(p - n - amylsulfonylphenacyl)hexamethylenetetraminium chloride

N - (p - dodecylsulfonylphenacyl)hexamethyleneteraminium chloride

N - (p - cyclohexylsulfonylphenacyl)hexamethylenetetraminium bromide

N - (o - methylsulfonylphenacyl)hexamethylenetetraminium bromide

N-(3 - methyl-4-methylsulfonylphenacyl)hexamethylenetetraminium bromide

N - (5 - chloro-2-methylsulfonylphenacyl)hexamethylenetetraminium bromide

N-(5 - isopropylsulfonyl-2-methoxyphenacyl)hexamethylenetetraminium bromide

The substituted hexamethylenetetraminium halides of the invention can be prepared by reacting an alpha-halosulfonylacetophenone of the formula 2. 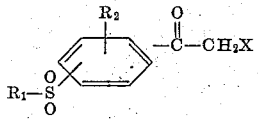

where $R_1$, $R_2$ and X have the same significance as in Formula 1, with hexamethylenetetramine in the presence of an organic compound such as, for instance, anisole, ethylidene chloride, or n-butyl chloride.

Anisole is the preferred medium in which to effect the reaction between a compound of Formula 2 and hexamethylenetetramine. For optimum yields of desired product the reaction medium should be vigorously agitated.

The preparation of the compounds represented by Formula 2 is fully described and claimed in my copending application, Serial No. 337,237, filed concurrently herewith. In brief, the compounds of Formula 2 are prepared from a compound of the formula 3. 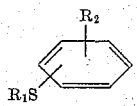

where $R_1$ and $R_2$ have the same significance as in Formula 1 by either a process consisting of the steps of acetylation, halogenation and oxidation, or alternatively, by reacting a compound of Formula 3 with a haloacetyl halide followed by oxidation of the mercapto radical to a sulfonyl group.

According to the present invention, the reaction between a compound of Formula 2 and hexamethylenetetramine can be effected at normal room temperature. The reaction may also be advantageously effected at slightly elevated temperatures, say, about 40° C. External heating is not, however, an essential feature of the process of this invention.

The N - (p - organosulfonylphenacyl)hexamethylenetetraminium halides of my invention are bactericides and fungicides. They are also useful in the preparation of synthetic antibiotics.

In order to better understand the invention reference should be had to the following illustrative examples:

*Example 1.—Preparation of N-(p-ethylsulfonylphenacyl)-hexamethylenetetraminimum bromide*

A mixture consisting of 50 g. of alpha-bromo-p-ethylsulfonylacetophenone, 35 g. of hexamethylenetetramine and 800 ml. of ethylidene chloride is stirred vigorously for a period of one hour at room temperature, then for thirty minutes at 40° C. and finally filtered. A solid product is suspended in 500 ml. of boiling chloroform. The product is filtered hot, collected, washed with 500 ml. of absolute ethanol and then with 500 ml. of ether. The white powder is N-(p-ethylsulfonylphenacyl)hexamethylenetetraminium bromide, M. P. 169–171° C. dec. It has the following structure:

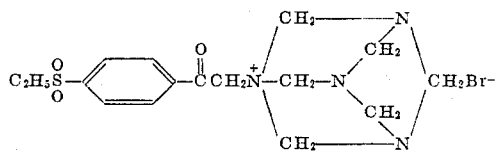

Analysis calculated for C₁₆H₂₃O₃N₄SBr: C, 44.55; H, 5.37; N, 12.99; S, 7.43. Found: C, 44.55; H, 5.61; N, 12.87; S, 7.37.

*Example 2.—Preparation of N-(p-n-propylsulfonylphenacyl)hexamethylenetetraminium bromide*

A mixture consisting of 89 g. of alpha-bromo-p-n-propylsulfonylacetophenone, 40.6 g. of hexamethylenetetramine and 750 ml. of anisole is stirred vigorously for a period of three hours. The resulting product is collected by filtration, washed by slurrying twice with 350 ml. of absolute ethanol, then twice with 350 ml. of ether and air-dried.

The washed product has a melting range of from 155 to 157° C. and smells strongly of anisole which is tenaciously retained. To prepare a sample for analysis a small portion of product is boiled with chloroform. The mixture is filtered and the product collected, cooled and dried. The product of this reaction is N-(p-n-propylsulfonylphenacyl)hexamethylenetetraminium bromide. It has the following structural formula and chemical analysis:

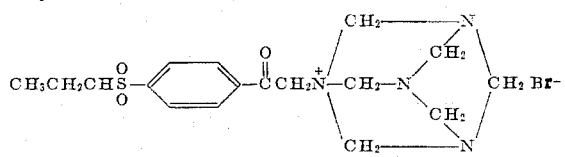

Analysis calculated for C₁₇H₂₅O₃N₄SBr: N, 12.58; S, 7.20. Found: N, 12.26; S, 6.83.

*Example 3.—Preparation of N-(p-isopropylsulfonylphenacyl)hexamethylenetetraminium bromide*

A mixture consisting of 169.5 g. of alpha-bromo-p-isopropylsulfonylacetophenone, 32.2 g. of hexamethylenetetramine and 600 ml. of ethylidene dichloride is stirred vigorously for a period of one hour. The desired bromide is collected by filtration and washed with 500 ml. of ether, M. P. 169–175° C. The product, N-(p-isopropylsulfonylphenacyl) hexamethylenetetraminium bromide, has the following formula:

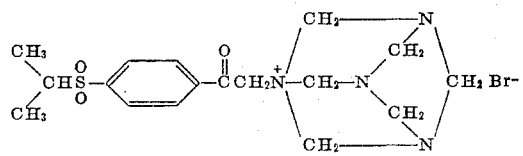

Analysis calculated for C₁₂H₂₅O₃N₄SBr: C, 45.84; H, 5.66. Found: C, 45.19; H, 5.60.

*Example 4.—Preparation of N-(p-n-butylsulfonylphenacyl)hexamethylenetetraminium bromide*

A mixture consisting of 120 g. of alpha-bromo-p-n-butylsulfonylacetophenone, 53 g. of hexamethylenetetramine and 400 ml. of anisole is stirred vigorously. A sticky gel begins forming shortly which makes stirring impossible. After the gel stands for a period of one hour, it hardens so that it can be crushed. Stirring of the reaction mixture is continued for a period of two hours. The mixture is filtered. A solid is collected and washed with ether. The solid is an anisole solvate of N-(p-n-butylsulfonylphenacyl)hexamethylenetetraminimum bromide, and may be represented by the following formula:

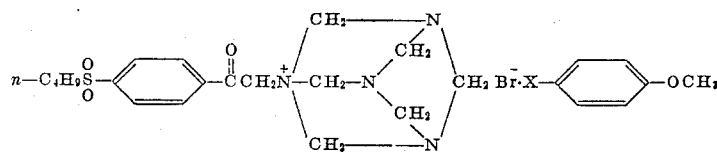

*Example 5.—Preparation of N-(p-n-amylsulfonylphenacyl)hexamethylenetetraminium bromide*

A mixture consisting of 44 g. of alpha-bromo-p-n-amylsulfonylacetophenone, 18.5 g. of hexamethylenetetramine and 600 ml. of n-butyl chloride is shaken vigorously for a period of one and one-half hours. The resulting solid product is collected by filtration, washed with ether and dried, M. P. 112–122° C. (dec.). The product, N - (p - n - amylsulfonylphenacyl)hexamethylenetetraminium bromide, may be represented by the following formula:

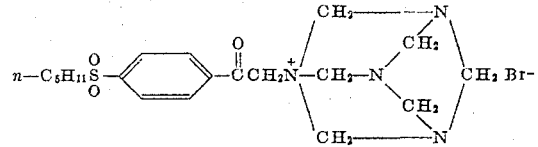

Analysis calculated for C₁₉H₂₇O₃N₄SBr: N, 11.83. Found: N, 11.68.

*Example 6.—Preparation of N-(p-dodecylsulfonylphenacyl)hexamethylenetetraminium bromide*

A mixture consisting of 123 g. of p-dodecylsulfonylphenacyl bromide, 39.9 g. of hexamethylenetetramine and 500 ml. of anisole is shaken vigorously on a mechanical stirrer for a period of one hour. A solid product results. It is collected by filtration, washed twice with ether and dried, M. P. 113–116° C. (dec.). An analytical sample of the product is purified by boiling with chloroform, cooling, diluting with ether, filtering it from the ether and drying. The sample melts at 113–116° C. (dec.). The product, N-(p-dodecylsulfonylphenacyl)hexamethylenetetraminium bromide, may be represented by the structural formula:

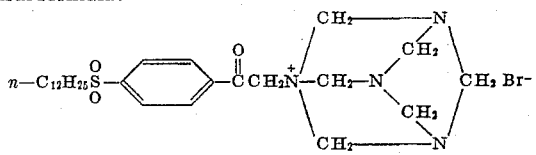

Analysis calculated for C₂₆H₄₃O₃N₄SBr: N, 9.80. Found: N, 9.79.

*Example 7.—Preparation of N - (p - cyclohexylsulfonylphenacyl)hexamethylenetetraminium bromide*

A mixture consisting of 103 g. of alpha-bromo-p-cyclohexylsulfonylacetophenone, 42 g. of hexamethylenetetramine and 420 ml. of anisole is shaken vigorously for a period of two and one-half hours. The reaction mixture is filtered, and a solid is collected, washed twice with 750 ml. of ether and dried, M. P. 165–172° C. dec. The solid is N-(p-cyclohexylsulfonylphenacyl)hexamethylenetetraminium bromide solvated with one molecule of anisole. It has the following structural formula:

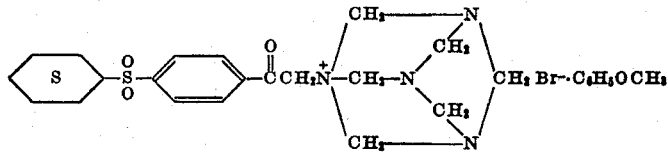

I claim:
1. A compound of the formula,

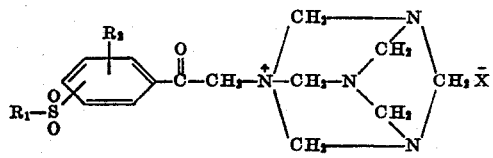

where $R_1$ is a member of the group consisting of alkyl, halogeno lower alkyl, cyclohexyl, cyclopentyl and vinyl groups, $R_2$ is a member of the class consisting of hydrogen, halogen, lower alkyl and lower alkoxy radicals, and X is a halogen of the group consisting of chlorine and bromine.

2. N - (p - alkylsulfonylphenacyl)hexamethylenetetraminium bromide.

3. N - (p - methylsulfonylphenacyl)hexamethylenetetraminium bromide.

4. N - (p - halogeno lower alkylsulfonylphenacyl)hexamethylenetetraminium bromide.

5. N - (p - ethylsulfonylphenacyl)hexamethylenetetraminium bromide.

6. N - [(p - trifluoromethylsulfonyl)phenacyl]hexamethylenetetraminium bromide.

References Cited in the file of this patent
UNITED STATES PATENTS
2,546,762    Long _____ Mar. 27, 1951